United States Patent
Cheng et al.

(10) Patent No.: US 7,089,965 B2
(45) Date of Patent: Aug. 15, 2006

(54) PIPE FOR TRANSPORTING AUTOMOBILE FLUIDS, COMPRISING A SMOOTH INNER TUBE AND AN ANNELLATED OUTER TUBE

(75) Inventors: Cyrielle Cheng, Saint-Jean de Monts (FR); Pierre Milhas, Vitry le Francois (FR)

(73) Assignee: Nobel Plastiques, S.A. (FR)

( * ) Notice: Subject to any disclaimer, the term of this patent is extended or adjusted under 35 U.S.C. 154(b) by 4 days.

(21) Appl. No.: 10/500,569

(22) PCT Filed: Jan. 22, 2003

(86) PCT No.: PCT/FR03/00207

§ 371 (c)(1),
(2), (4) Date: Jul. 1, 2004

(87) PCT Pub. No.: WO03/064910

PCT Pub. Date: Aug. 7, 2003

(65) Prior Publication Data

US 2005/0092383 A1    May 5, 2005

(30) Foreign Application Priority Data

Jan. 31, 2002 (FR) .................................. 02 01134

(51) Int. Cl.
*F16L 11/11* (2006.01)

(52) U.S. Cl. ............... 138/121; 138/122; 138/137; 138/141; 138/DIG. 7

(58) Field of Classification Search ............... 138/121, 138/122, 137, 141, 140, 173, 110
See application file for complete search history.

(56) References Cited

U.S. PATENT DOCUMENTS

| | | | | |
|---|---|---|---|---|
| 2,898,941 A * | 8/1959 | Kilcup | ............... | 138/121 |
| 3,330,303 A * | 7/1967 | Fochler | ............... | 138/120 |
| 3,538,209 A * | 11/1970 | Hegler | ............... | 264/508 |
| 3,916,505 A | 11/1975 | White | ............... | 156/143 |
| 4,312,383 A * | 1/1982 | Kleykamp | ............... | 138/103 |
| 4,487,232 A * | 12/1984 | Kanao | ............... | 138/122 |
| 4,967,799 A * | 11/1990 | Bradshaw et al. | ............... | 138/121 |
| 5,148,837 A * | 9/1992 | .ANG.gren et al. | ............... | 138/121 |
| 5,570,711 A | 11/1996 | Walsh | ............... | 138/137 |
| 5,588,468 A * | 12/1996 | Pfleger | ............... | 138/121 |
| 5,706,864 A * | 1/1998 | Pfleger | ............... | 138/121 |
| 5,727,599 A * | 3/1998 | Fisher et al. | ............... | 138/156 |
| 5,792,532 A * | 8/1998 | Pfleger | ............... | 428/36.9 |
| RE37,279 E * | 7/2001 | Fisher et al. | ............... | 138/156 |
| 6,776,195 B1 * | 8/2004 | Blasko et al. | ............... | 138/141 |

FOREIGN PATENT DOCUMENTS

| | | |
|---|---|---|
| EP | 1 101 994 | 5/2001 |
| GB | 2 300 683 | 11/1996 |

\* cited by examiner

*Primary Examiner*—Patrick Brinson
(74) *Attorney, Agent, or Firm*—Dykema Gossett PLLC

(57) ABSTRACT

A pipe for transporting automobile fluids includes a smooth inner tube (1) based on a fluorinated thermoplastic material, a corrugated outer tube (2) in contact with the inner tube via the inside peaks (3) of its corrugations, and made of a polyamide-based thermoplastic material, and elements for connecting the outer and inner tubes together.

8 Claims, 1 Drawing Sheet

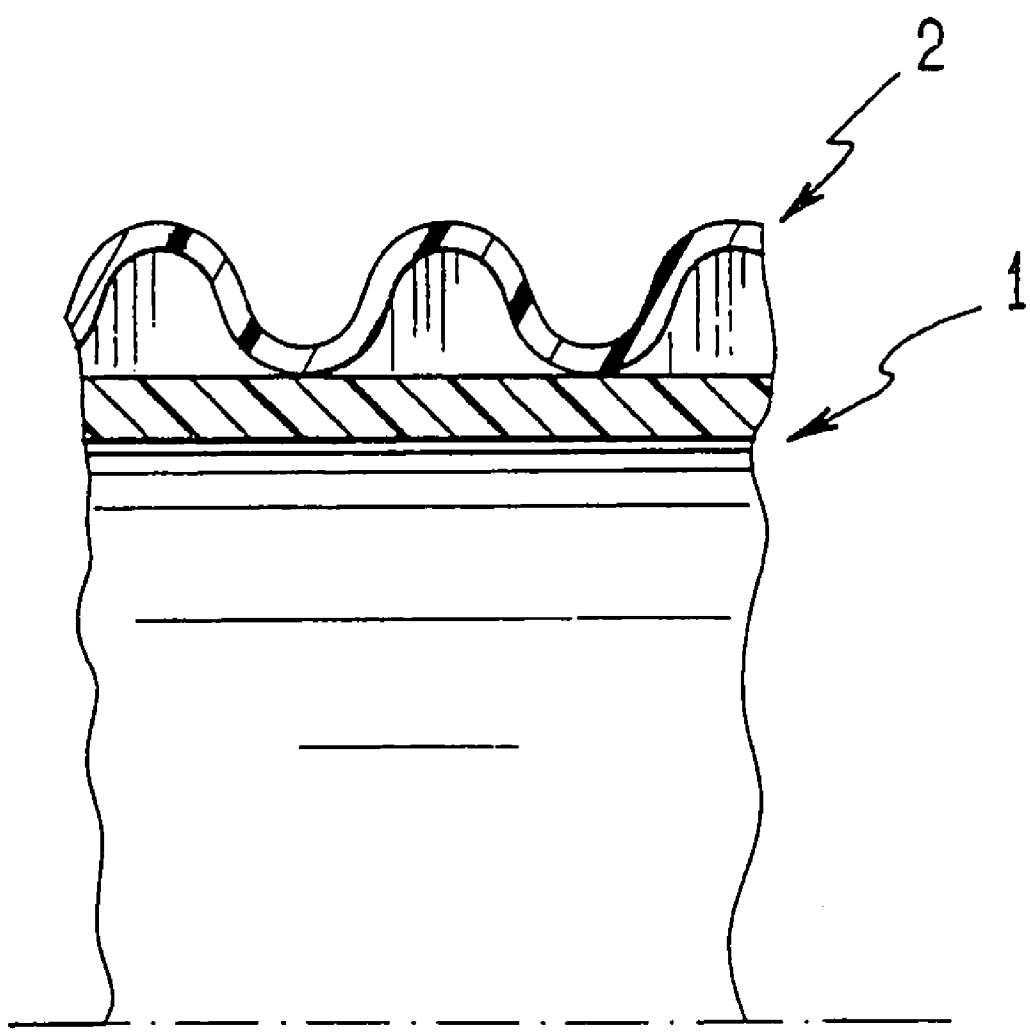

PIPE FOR TRANSPORTING AUTOMOBILE FLUIDS, COMPRISING A SMOOTH INNER TUBE AND AN ANNELLATED OUTER TUBE

The present invention relates to a pipe for transporting automobile fluids such as cooling liquid, fuel, windshield wiper fluid, . . . .

BACKGROUND OF THE INVENTION

Amongst the pipes used in a motor vehicle, there are smooth pipes of large diameter presenting bends and which are intended, for example, to form the fuel tank filler pipe. Such pipes are made by blow-molding. Unfortunately, that method of manufacture is relatively expensive. Attempts have been made to make such pipes by extrusion followed by hot-forming, since that method of manufacture is less expensive and also makes it possible to obtain pipes that are lighter than those obtained by blow-molding. However, that method has been found to be difficult because extruded pipes tend to flatten while they are being shaped.

That type of problem is to be found in general manner in all smooth pipes made of plastics material that are shaped in such a manner as to have bends so that their shape matches the environment in which they are to be installed. More particularly, such structures are not suitable for diameters in excess of 25 millimeters (mm) since they are difficult to shape by thermoforming: a smooth pipe of large diameter tends to kink as soon as too small a radius of curvature is imparted thereto.

Attempts have been made to replace such smooth pipes with corrugated pipes which are easier to shape. Nevertheless, such pipes lead to problems of fluids foaming, in particular of fuel foaming, problems of noise, and problems of head loss.

Furthermore, another drawback of the pipes presently in use lies in the fact that it is difficult to obtain permeability to automobile fluids that is low enough to enable them to perform their function effectively. This drawback is particularly harmful in corrugated pipes which present a large surface area in contact with the fluid.

To obviate that drawback, is it known to use multilayer pipes, but they too are relatively expensive.

OBJECT OF THE INVENTION

It would thus be most advantageous to have automobile fluid transport pipes that remedy the drawbacks of prior art pipes, at least in part.

BRIEF DESCRIPTION OF THE INVENTION

To this end, the invention provides a pipe for transporting automobile fluids, comprising a smooth inner tube based on a fluorinated thermoplastic material, a corrugated outer tube which is in contact with the inner tube via the inside peaks of its corrugations and which is made of a polyamide-based thermoplastic material, and means for connecting together the outer tube and the inner tube.

The pipe as obtained in this way is particularly well adapted to transporting automobile fluids, and presents good aptitude to being shaped, in particular by being deformed elastically. The pipe is also simple and inexpensive to make. The smooth inner tube also makes it simple to make connections with the members to which the pipe is to be connected, for example by means of nipples secured to the members and engaged as a force-fit inside the inner tube.

In a particular embodiment, the tubes are single-layer tubes, the polyamide used is a polyamide 12, and the fluorinated thermoplastic is one of he following materials:
a polyvinylidene fluoride (PVDF);
a polytetrafluoroethylene (PTFE);
an ethylene tetrafluoroethylene (ETFE); and
an ethylene perfluoroethylene (EFEP).

This embodiment presents very good characteristics for transporting automobile fluids.

Other characteristics and advantages of the invention will appear on reading the following description of a particular and non-limiting embodiment of the invention.

BRIEF DESCRIPTION OF THE DRAWING

Reference is made to the sole accompanying FIGURE which is a fragmentary half-view in longitudinal section of a pipe in accordance with the invention.

DETAILED DESCRIPTION OF AN EMBODIMENT OF THE INVENTION

With reference to the FIGURE, the pipe of the invention comprises an inner tube given overall reference 1, and an outer tube given overall reference 2, surrounding the inner tube 1.

The inner tube 1 is a smooth tube in this case having a single-layer structure of fluorinated thermoplastic material. The fluorinated thermoplastic material used is a polyvinylidene fluoride (PVDF), or a polytetrafluoroethylene (PTFE), or an ethylene tetrafluoroethylene (ETFE), or is based on an ethylene perfluoroethylene (EFEP).

The outer tube 2 is a corrugated tube in which the corrugations have inside peaks 3 of inside diameter equal to or substantially very close to the outside diameter of the inner tube. The tubes 1 and 2 are connected together either at each of the inside peaks 3 by adhesive or by bonding, e.g. during a coextrusion method, or else, if the pipe is of determined length, merely at its ends by putting the outer tube mechanically into abutment against a flange on the inner tube 1 with or without adhesive between the ends of the tubes 1 and 2. When it is desired that the inner and outer tubes 1 and 2 be secured to each other at each inside peak 3 of a corrugation in the outer tube 2, the materials selected are naturally suitable for bonding together or for being stuck together.

The outer tube 2 in this case is of single-layer structure being made of polyamide, and preferably of polyamide 12.

The materials used may be recycled materials obtained, for example, by grinding tube scrap, thereby leading to less pollution and achieving economic savings.

The tube is obtained by means of a conventional machine comprising an extruder head having a first channel for producing a "parison" or blank which, under the effect of external suction, is pressed against hinged molds surrounding the extrusion head and moving parallel to the axis thereof. A second extrusion channel, downstream from the extrusion of the parison, enables the corrugated tube formed by the parison inside the mold to be lined with a smooth inner tube, thus producing the pipe of the invention. Advantageously, a channel can be provided in the extrusion head between the corrugated tube and the smooth tube for delivering an inert gas which will contribute to reducing the permeability of the pipe of the invention. This inert gas which may be air, nitrogen, or any other suitable gas, can be maintained under pressure inside the corrugations of the corrugated tube, with this pressure constituting an isolating element combating migration of vapor from the inside or the outside through the walls of the tubes.

The connection between the two tubes is made in leak-tight manner, and preferably at each inside peak of a corrugation in the corrugated tube.

Naturally, the invention is not limited to the embodiment described and variants can be applied thereto without going beyond the ambit of the invention as defined by the claims.

In particular, another fluorinated thermoplastic material can be used for making the inner tube. In addition, the inner tube may include a conductive inner layer for evacuating the electrostatic charge that is generated by friction of the transported fluid rubbing along the pipe. This limits any risk of explosion when the transported fluid is flammable. The material of the tube 1 is selected as a function of its chemical resistance and its permeability relative to the fluid being conveyed, whereas the material of the tube 2 is selected mainly for its characteristics of resistance to the outside atmosphere, its chemical inertness, its corrosion resistance, and its mechanical strength.

The invention claimed is:

1. A pipe for transporting automobile fluids, the pipe comprising a smooth inner tube (1) comprised of a fluorinated thermoplastic material, a corrugated outer tube (2) which is in contact with the inner tube via the inside peaks (3) of its corrugations and which is made of a polyamide-based thermoplastic material, and means for connecting together the outer tube and the inner tube.

2. A pipe according to claim 1, wherein the polyamide used is a polyamide 12.

3. A pipe according to claim 1, wherein the fluorinated thermoplastic is a polyvinylidene fluoride (PVDF).

4. A pipe according to claim 1, wherein the fluorinated thermoplastic is a polytetrafluoroethylene (PTFE).

5. A pipe according to claim 1, wherein the fluorinated thermoplastic is an ethylene tetrafluoroethylene (ETFE).

6. A pipe according to claim 1, wherein the fluorinated thermoplastic is based on an ethylene perfluoroethylene (EFEP).

7. A pipe according to claim 1, wherein the inner tube (1) is a single-layer tube.

8. A pipe according to claim 1, wherein the outer tube (2) is a single-layer tube.

* * * * *